United States Patent [19]

Fink et al.

[11] Patent Number: 5,605,432
[45] Date of Patent: Feb. 25, 1997

[54] ROBOT MANIPULATOR

[75] Inventors: Friedhelm Fink; Klaus Panthel, both of Taunusstein; Hans-Werner Fuchs, Thurnau, all of Germany

[73] Assignee: Hauni Maschinenbau AG, Hamburg, Germany

[21] Appl. No.: 216,892

[22] Filed: Mar. 23, 1994

[30] Foreign Application Priority Data

Mar. 24, 1993 [DE] Germany .......................... 43 09 539.9
Mar. 4, 1994 [DE] Germany .......................... 44 07 324.0

[51] Int. Cl.⁶ .................................................. B65G 47/91
[52] U.S. Cl. ........................ 414/752; 414/910; 414/796; 901/16
[58] Field of Search ................................. 294/2, 93, 97; 414/752, 910, 911, 796, 901; 901/16, 29, 40, 41; 483/901

[56] References Cited

U.S. PATENT DOCUMENTS

| | | | |
|---|---|---|---|
| 4,620,362 | 11/1986 | Reynolds | 483/901 |
| 4,723,353 | 2/1988 | Monforte | 483/901 |
| 4,781,519 | 11/1988 | Monforte | 901/41 |
| 4,911,608 | 3/1990 | Krappitz et al. | 414/796 |
| 5,050,919 | 9/1991 | Yakou | 294/2 |
| 5,102,292 | 4/1992 | Brinker et al. | 414/796 |
| 5,211,435 | 5/1993 | Nagai et al. | 901/40 |

FOREIGN PATENT DOCUMENTS

| | | |
|---|---|---|
| 0396210 | 11/1990 | European Pat. Off. . |
| 3432262 | 5/1989 | Germany . |
| 3740995 | 6/1989 | Germany . |

*Primary Examiner*—Karen B. Merritt
*Assistant Examiner*—Gregory A. Morse
*Attorney, Agent, or Firm*—Darby & Darby

[57] ABSTRACT

A robot manipulator has an arm with a head which is mounted for movement up and down, along a first horizontal path, along a second horizontal path at right angles to the first path, about a vertical axis and about a horizontal axis so that it can reach all portions of a storage facility for bobbins, stacked blanks and/or other commodities which are to be fed to one or more tobacco processing machines. The head has a jaw chuck which can engage a cylindrical internal surface of a bobbin or the cylindrical internal surface of a tool which is used for the transport of stacks of superimposed blanks of paper or the like. The head further has a vertically movable annular pusher which can strip a bobbin off the chuck or which can actuate one or more pivotable supports forming part of the tool and serving to prop one or more stacks from below. The tool is provided with suction heads which can lift one or more stacks off a pallet in the storage facility preparatory to pivoting of the support or supports to operative positions beneath the lifted stack or stacks. A vertically movable platform cooperates with a conveyor for transferred stacks or bobbins to accept the stacks from the tool preparatory to pivoting of the support or supports to their idle positions and to thereupon deposit the stack or stacks on the conveyor.

6 Claims, 5 Drawing Sheets

ROBOT MANIPULATOR

BACKGROUND OF THE INVENTION

The invention relates to robot manipulators in general, and more particularly to improvements in robot arms. Still more particularly, the invention relates to improvements in industrial robot arms which can be utilized in or with portal type overhead conveyors, for example, to transport stacks of tied-together flat cardboard blanks, rolls of convoluted (i.e., wound or rolled) flexible sheet material or the like, e.g., in tobacco processing plants.

Robot arms which form part of or constitute portal type overhead conveyors are or can be used in many branches of the tobacco processing industry. For example, such apparatus (hereinafter called manipulators for short) can be utilized to deliver fresh bobbins of convoluted paper or other flexible sheet material as well as to remove empty bobbins from bobbin changers which are utilized in cigarette makers to supply a continuous web of cigarette paper to a wrapping station where the web is draped around a continuous rod-like filler of natural, reconstituted and/or substitute tobacco. Furthermore, such manipulators can be used in cigarette packing machines to transfer stacks of blanks from pallets to conveyors which deliver the stacks to the packing machine proper. For example, the blanks can be converted into the containers of so-called hinge lid packets for arrays of four, five, ten, twenty or twentyone plain or filter cigarettes.

Published German patent application No. 33 44 903 discloses a gripper for use on the arm of an industrial robot. The robot arm carries a pivotable twin arm the ends of which carry rapid-action couplings for attachment of specially designed grippers serving to manipulate printed circuit boards and foils. A drawback of the robot arm which is disclosed in the aforementioned published German patent application is that it does not include any means for supporting a load from below. Thus, a printed circuit board is lifted, held and transported solely by suction which is unsatisfactory because the robot arm cannot carry out rapid movements such as would be likely to overcome the suction force between the printed circuit board and a suction-operated gripper, i.e., movements which would entail the generation of acceleration forces greater than the suction between a gripper and the load which is suspended thereon solely by suction. Moreover, the robot arm is not capable of directly accepting and transferring loads, i.e., it is necessary to furnish the manipulator with a number of specifically designed grippers, one for each type of load.

Published German patent application No. 35 02 182 discloses a system which is designed to accurately adjust the gripper of a robot which is provided with means for supporting the load from below. The supporting means is pivotable between an idle position and an operative position in response to actuation of a linkage. The gripper is designed to engage the sides of a load; therefore, such gripper cannot be used to lift and transport objects which are stacked on a pallet or the like in close or immediate proximity to each other. Another draback of the just described manipulator is that it must be equipped with a complex, bulky and expensive mechanism for powering its supporting means.

Published German patent application No. 40 28 150 discloses a manipulator which is to be used to supply stacks of sheets to a packing machine. The gripper is designed in such a way that it can manipulate only complete series of stacks, i.e., the versatility of the manipulator is highly unsatisfactory because it is designed to manipulate only a single type of load.

European patent application No. 0 411 523 discloses a manipulator which is designed to transport tied-together stacks of sheet-like objects, such as for example stacks of tied-together flat blanks which are to be converted into containers in packing machines. The manipulator comprises a head with grippers serving to engage stacks of blanks. The specific example which is disclosed in the European patent application employs suction-operated grippers which cooperate with means for supporting the stacks from below. This is to ensure that the grippers can rapidly transfer stacks of superimposed blanks which are to be utilized in the packing machine. A drawback of the just described manipulator is that it must be equipped with a specially designed head for reception of stacked blanks and also that a specially designed actuating mechanism must be provided to operate the supporting means which prop the stacks from below. All this reduces the versatility of the manipulator, i.e., the manipulator which is disclosed in the European patent application is not readily convertible for the manipulation of different loads. Moreover, the conversion is expensive and time consuming.

OBJECTS OF THE INVENTION

An object of the invention is to provide a manipulator with a robot arm which is more versatile than heretofore known robot arms.

Another object of the invention is to provide a robot arm which can be rapidly converted for the manipulation of different loads.

A further object of the invention is to provide a robot arm whose head is designed to accept, support, transfer and/or otherwise manipulate different loads without the need for any, or any appreciable, conversion.

An additional object of the invention is to provide novel and improved grippers for use in the above outlined manipulator.

Still another object of the invention is to provide a novel and improved tool which can be utilized in the above outlined manipulator.

A further object of the invention is to provide a novel and improved combination of robot arm and tool for use in the above outlined manipulator.

Another object of the invention is to provide a novel and improved combination of mechanical and fluid-operated means for delivering commodities to and/or for removing objects from a machine for the production of smokers' products.

An additional object of the invention is to provide a robot arm which can transfer loads without the utilization of specially designed tools and which can also be put to use in combination with special tools.

Still another object of the invention is to provide a convertible robot arm.

A further object of the invention is to provide a manipulator which can be installed in existing tobacco processing plants for the transfer of discrete objects or groups of objects.

SUMMARY OF THE INVENTION

The invention is embodied in a manipulator which includes a robot arm with a head movable along a plurality of substantially straight paths and rotatable about one or more axes, and a tool having means for gripping stacks of preferably tied-together substantially flat objects (such as cardboard blanks for the making of so-called hinge lid packets for cigarettes or other rod-shaped articles of the tobacco processing industry). The gripping means includes suction-operated means for engaging the stacks from above and mobile means for supporting the stacks from below, and the manipulator further comprises means for mechanically and separably coupling the tool to the head of the robot arm. The coupling means comprises a jaw chuck which is provided on the head and serves to engage a substantially cylindrical surface of the tool. The manipulator further comprises a suction generating device (e.g., a vacuum pump, a fan or the like), means for connecting the suction generating device to the suction-operated means of the tool when the latter is coupled to the head of the robot arm, and means for moving the supporting means. The moving means comprises a pusher which is movably carried by the head and means for transmitting motion from the pusher to the supporting means.

In accordance with a presently preferred embodiment, the head of the robot arm is movable along three straight paths which are normal to each other and the head is rotatable about two axes which are also normal to each other. The connecting means can comprise at least one at least partly flexible conduit and means for separably connecting the at least one conduit with the suction generating device or with the suction-operated means.

The jaw chuck is or can be constructed and assembled to engage an internal surface of a bobbin in lieu of the cylindrical surface of the tool. The bobbin can serve for storage of a convoluted web of cigarette paper, tipping paper or other sheet material which is utilized in cigarette making plants or other plants of the tobacco processing industry. The pusher is preferably movable to disengage the bobbin from the chuck.

The pusher can include an annular member.

The tool can include a tubular member (e.g., a short hollow cylinder) and the aforementioned substantially cylindrical surface is then part of or constitutes an internal surface of the tubular member.

The coupling means can include or constitute a form-locking or a force-locking connection between the tool and the head of the robot arm.

The tool can further comprise a base, the aforementioned tubular member which can serve to center the tool on the head and is provided on the base, a plurality of substantially pin-shaped centering elements engaging the head when the tool is coupled to the head, and a carrier which is affixed to the base. The motion transmitting means of such tool can include a linkage which is provided on the carrier.

The suction-operated means can comprise at least one set of elastic suction heads and a holder which movably supports the suction heads, preferably with substantial freedom of movement relative thereto.

It is often preferred to employ suction-operated means having a plurality of sets of suction heads with each set arranged to engage and to attract a discrete stack. The connecting means of such manipulator preferably includes means for establishing separate connections between the suction generating device and the sets of suction heads so that each set can be activated or deactivated independently of each other set.

The supporting means can include a plurality of supports each of which is designed to support a discrete stack. The motion transmitting means of such manipulator preferably comprises a discrete power train for each of the supports and such power trains are operable to transmit motion to the respective supports independently of each other support. The suction-operated means of such manipulator preferably comprises a holder of suction heads for each of the supports, and the holders and the supports are respectively movable relative to each other in substantially horizontal planes to thus rapidly convert the gripping means for gripping larger or smaller stacks.

The tool can comprise a carrier for the supporting means and the motion transmitting means can comprise at least one lever which is pivotable on the carrier and has follower means engageable by the pusher on the head, a shaft which is rotatably mounted in the carrier and mounts the supporting means, a connecting member which receives motion from the at least one lever, and a transmission between the connecting member and the shaft. The connecting member can include or constitute a push rod and the transmission can constitute a gear transmission. The follower means can include at least one roller follower on the at least one lever. The pusher is movable in the direction of the axis of the robot arm and the supporting means of the tool is preferably pivotable between an idle or inoperative position and an operative position in which the roller follower abuts the base of the tool. The motion transmitting means of the tool can further comprise means for biasing the at least one roller follower away from the base. The transmission can comprise a first gear which is connected with the aforementioned shaft and a second gear which mates with the first gear and is connected with the connecting member of the motion transmitting means.

The supporting means can comprise at least one polygonal plate, e.g., a substantially rectangular plate.

The novel features which are considered as characteristic of the invention are set forth in particular in the appended claims. The improved manipulator itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
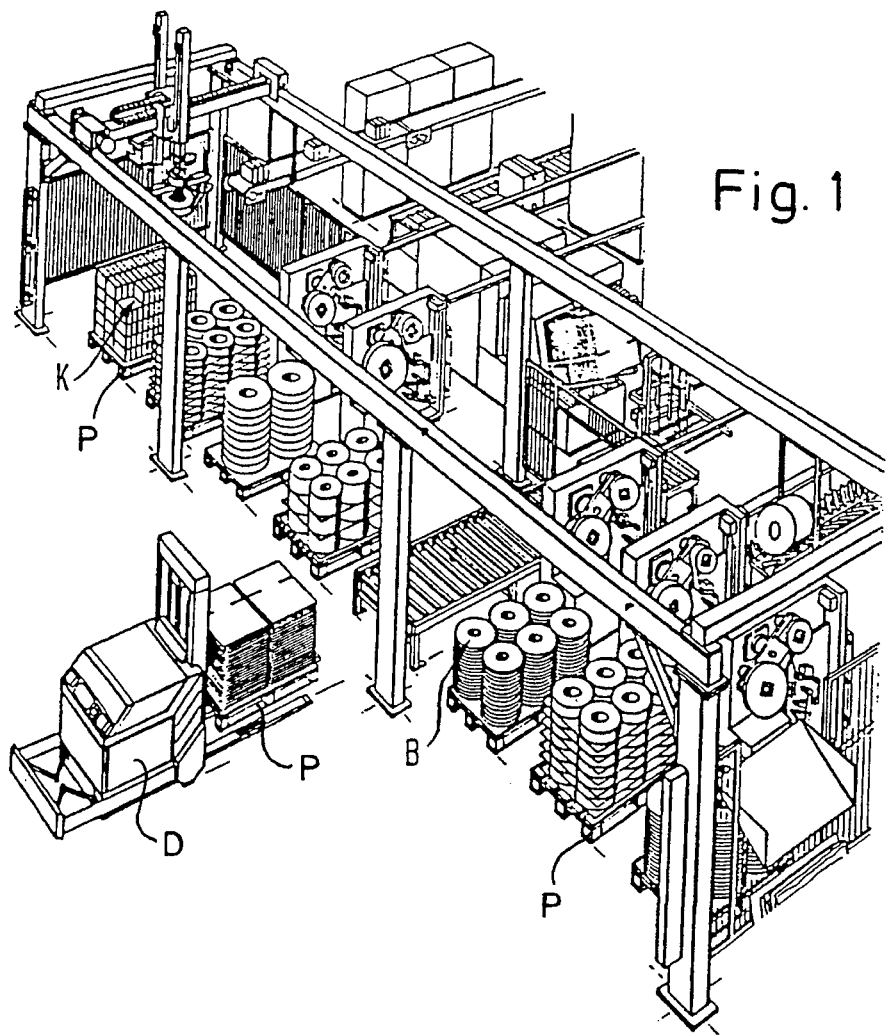
FIG. 1 is a perspective view of a storage facility for various commodities at least some of which can be removed from storage by a robot manipulator having an arm which is constructed and assembled and which can cooperate with one or more tools in accordance with the present invention, the robot arm being shown in the upper left-hand portion of the Figure and a driverless conveyance for delivery of pallets carrying stacked blanks being shown in the process of delivering two stacks to a roller conveyor in the storage facility.
Figure 2:
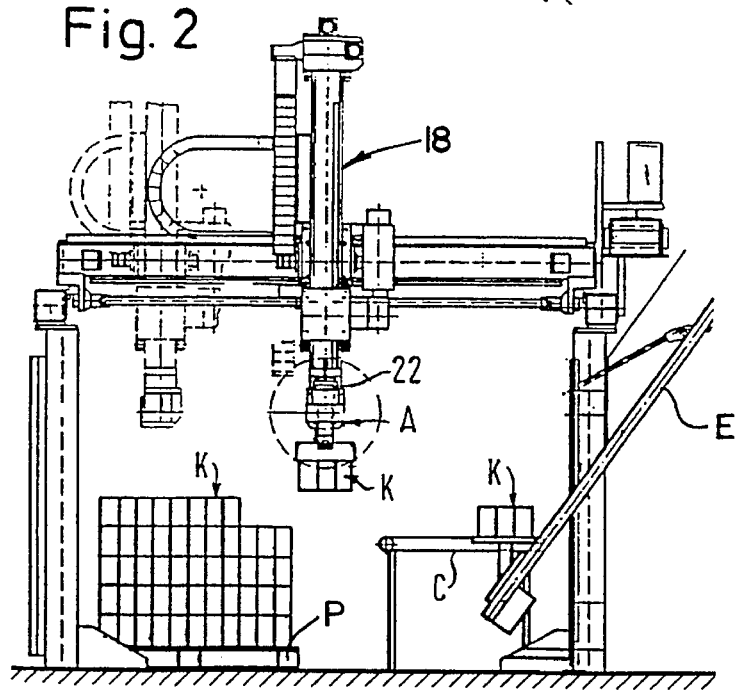
FIG. 2 is an enlarged view of a detail in FIG. 1, showing the manipulator in the process of simultaneously transferring three stacks from a pallet to a composite conveyor in the storage facility.

Referring first to FIGS. 1 and 2, there is shown a storage facility for various types of materials which are to be delivered to production lines in a cigarette making plant. The stored materials include stacks K of superimposed and tied-together cardboard blanks which are to be converted into hinge lid packets for confinement of arrays of plain or filter cigarettes, and bobbins B of convoluted cigarette paper, tipping paper or other sheet material. The materials are temporarily stored on pallets P and are to be transported to consuming machines when necessary. The means for removing stored stacks K and bobbins from the storage facility includes a robot manipulator which is shown in the upper left-hand portion of FIG. 1 and in FIG. 2. The means for delivering goods to the storage facility of FIGS. 1 and 2 comprises a preferably driverless conveyance D which is or which can be operated by remote control. The manipulator is designed to pick up stacks K of blanks or bobbins B from the respective pallets P and to deliver them into the range of an endless band (belt or chain) conveyor C which, in turn, delivers the stacks or bobbins to an elevator conveyor E serving to transport the accepted commodities to the consuming or processing machine or machines, not shown.

Figure 3:
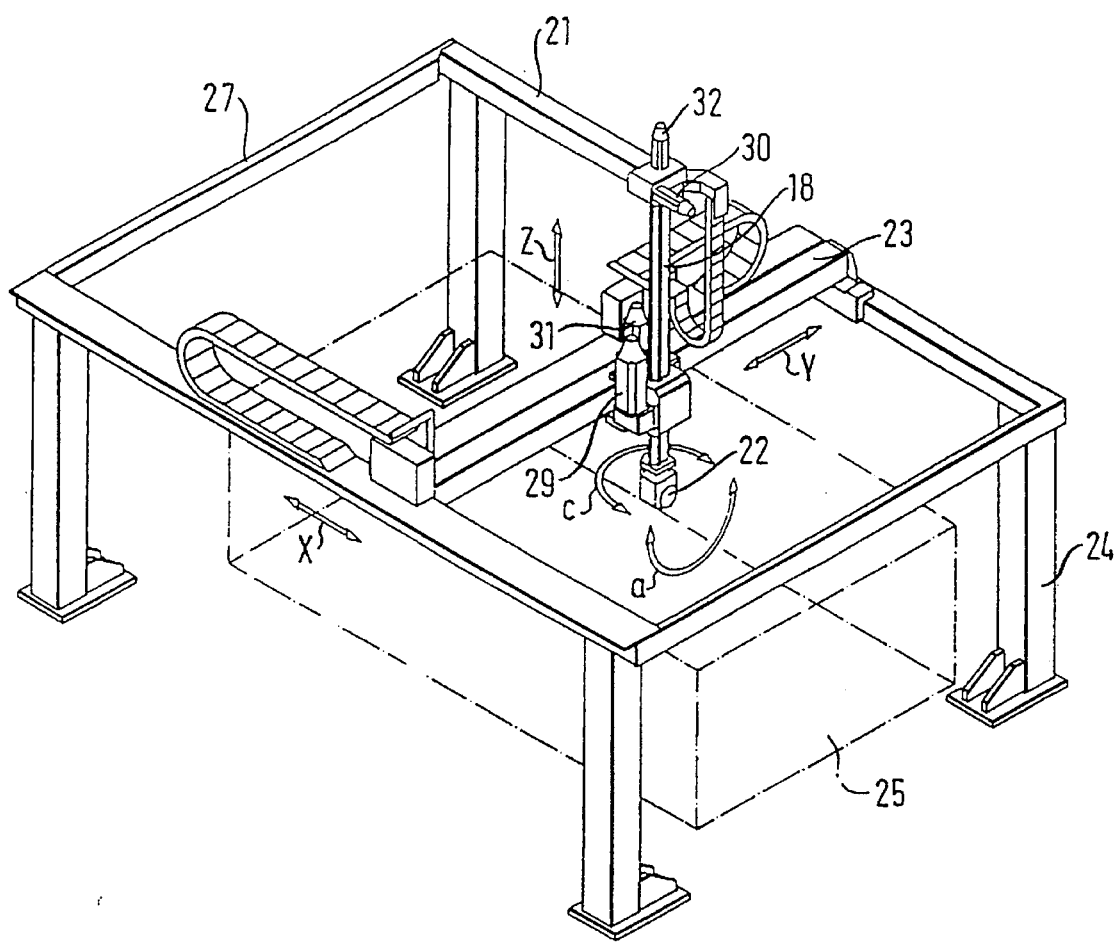
FIG. 3 is a schematic perspective view of the manipulator which includes the robot arm of FIGS. 1 and 2.

As can be seen in FIGS. 2 and 3, the robot manipulator of the present invention comprises a robot arm 18 having at its lower end a head 22 which can cooperate with a tool A designed to simultaneously accept, to simultaneously transport and to simultaneously deposit on the band conveyor C a set or row of three neighboring stacks K. This speeds up the removal of stacks K from the respective pallets P so that the emptied pallets can be reengaged by the conveyance D and returned to a loading station for reception of a fresh supply of stacks K. The range of the head 22 of the robot arm 18 is such that the tool A (or another tool) which is coupled to the head 22 can reach each part of the storage facility as well as that the head 22 itself can reach each part of the storage facility for removal of stored commodities or for return of spent commodities (such as empty bobbins B).

The head 22 of the robot arm 18 which is shown in FIG. 3 is coupled with the tool A and can move the tool to each and every part of the space 25 which serves for temporary storage of pallets P carrying accumulations of stacks K, stacks of bobbins B and/or other goods which are to be automatically removed from the respective pallets P for transfer onto the band conveyor C. The manipulator of FIG. 3 comprises a frame including four uprights 24, two elongated longitudinally extending horizontal frame members 21 and two transversely extending horizontal frame members 27. The number of uprights 24 can be increased to five, six or more, depending on the dimensions of the frame, the strength of its constituents and the combined weight of the robot arm 18 and of the goods which are being transported between the pallets P and the conveyor C.

The frame members 21 movably support the respective end portions of a crosshead or carriage 23 which, in turn, longitudinally movably supports the robot arm 18. The crosshead 23 constitutes or forms part of a prime mover which serves to advance the robot arm 18, its head 22 and the tool A along a first straight horizontal path in directions indicated by an arrow X. The manipulator further comprises four additional prime movers 29, 30, 31 and 32. One of these additional prime movers serves to advance the robot arm along a second straight path in directions indicated by an arrow Y, another additional prime mover can advance the arm 18 along a straight vertical path in directions indicated by an arrow Z, a third additional prime mover can rotate the head 22 and the tool A thereon about a horizontal axis in directions indicated by a double-headed arrow a, and the fourth additional prime mover can turn the head 22 and the tool A thereon about a vertical axis in directions indicated by a double-headed arrow c. The two axes are normal to each other, and the three paths are also normal to each other. The just described movability of the arm 18 and of its head 22 enables the tool A (or the head 22 alone or the head and a tool other than the tool A) to reach each and every part of the space 25. The pallets P in the space 25 are distributed in accordance with a preselected pattern so that the tool A can be automatically guided to reach the commodities on a selected pallet for transfer onto the conveyor C. As already mentioned above, the pallets P can support arrayed stacks K of blanks which are tied together so that their mutual positions are not changed during transport by the tool A and/or bobbins B of cigarette paper, tipping paper or other webs of sheet-like material. Furthermore, the pallets P can serve to deliver stacks of blanks which are to be converted into cartons for the reception and confinement of selected numbers of packets, e.g., of sets of ten hinge lid packets each of which contains 20 plain or filter cigarettes.

The space 25 can further accommodate one or more spare tools which are to replace the tool A in order to perform a specific function, e.g., to transport carton blanks or other commodities which are to be used in a production line for plain or filter cigarettes or other rod-shaped articles of the tobacco processing industry and/or which are to supply commodities to one or more packing, carton filling or other machines, not specifically shown. The illustrated manipulator is constructed in such a way that the head 22 is to be turned about a horizontal axis (arrow a) in order to be relieved of a tool and to deposit such tool in the allocated portion of the space 25 and/or to pick up a selected tool from such allocated portion of the space 25. Gripping means or grippers which actually engage the stacks K or bobbins B or other commodities for transfer to the conveyor C (or to another destination) can be provided on the tools (including the tool A) and/or directly on the head 22. The illustrated head 22 includes a jaw chuck F (FIG. 4) which forms part of the means for mechanically and separably coupling the head 22 to the tool A or to another tool. In addition, the chuck F can serve as a means for mechanically and separably connecting the head 22 with a bobbin B in that its jaws are caused to enter into and to engage the normally cylindrical internal surface in the hollow core of a bobbin B. Furthermore, the chuck F can be used to return empty or expired bobbins B from the conveyor C or from any other suitable returning device onto a pallet P in the space 25. The illustrated chuck F is assumed to have three jaws. If desired or necessary or advisable, a different chuck (such as for example a so-called parallel gripper) can be provided on the head 22 or on a tool to serve as a means for releasably engaging and holding empty bobbins and for returning such empty bobbins to a pallet P in or at the space 25.

In order to reliably engage, lift, transport and deposit stacks K, the tool A is provided with suction-operated means (including sets of elastic suction cups 12) for lifting groups of three neighboring stacks K (see FIG. 2) off a pallet P, and with mobile means (including the parts 13) for supporting such groups of neighboring stacks K from below. This ensures that the tool A (with a group of three stacks K) can be rapidly moved from a position of register with the corresponding pallet P to a position for deposition of the group of three stacks K on the conveyor C. Each stack K comprises a pile containing a predetermined number of superimposed overlapping cardboard blanks or blanks made of another suitable material which can be used for the making of hinge lid packets or other types of packets for arrays of cigarettes or other rod-shaped articles of the tobacco processing industry. In order to ensure that the individual blanks of a stack K cannot move relative to each other prior to reaching the space 25 and/or during transport by the tool A to the conveyor C and/or on the conveyor C, it is often preferred to tie the stacked blanks to each other by straps or bands of paper or the like. The material of the straps is preferably selected with a view to exhibit a certain resistance to tensional stresses as well as to be at last substantially impermeable to fluids. For example, the sheet or web or band material of which the straps for stacked blanks are made can be paper which is coated with a suitable dispersion ensuring that the paper forming part of spent straps can be readily recycled.

Figure 4:
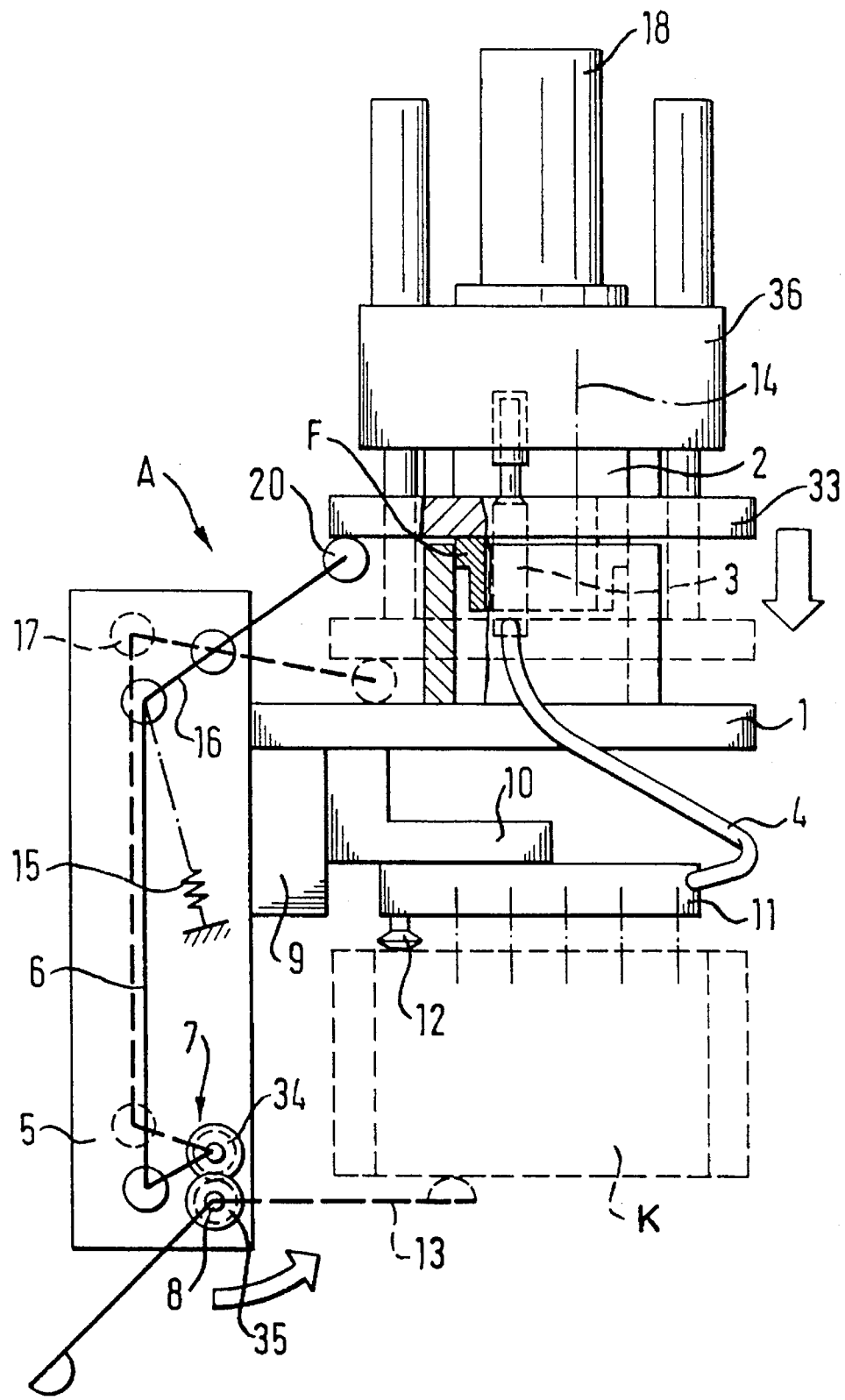
FIG. 4 is a schematic partly elevational and partly sectional view of the head of the robot arm, of a tool which is coupled with the head, and of a stack which is being attracted to the tool by suction while being simultaneously supported from below.

The details of the illustrated tool A are shown schematically in FIG. 4. This tool is assumed to be located at a predetermined part of the space 25 so that it can readily engage a group of three neighboring stacks K. The tool A is held in such position by the head of the robot arm 18, and such position is memorized by the control system of the manipulator. The robot arm 18 reliably holds its head 22 and hence the tool A in the selected position which is memorized by the control system. If the tool A is uncoupled from the head 22 at a time when the robot arm 18 is to transfer one or more groups of three stacks K each from a pallet P to the conveyor C, the control system transmits a signal which causes the robot arm to move its head to a position in which the head can be coupled to the tool A, and the jaw chuck F is thereupon actuated to engage the at least substantially cylindrical internal surface of a tubular centering member 2. However, the engagement of the centering member 2 is preceded by a movement of the head 22 to the locus of those stacks K which are to be transferred from a pallet P onto the conveyor C. The head 22 is then caused to move in one of the two directions indicated by the arrow Z in FIG. 3, i.e., the robot arm 18 ascertains the exact level of the group of stacks K which are about to be lifted off their pallet P. The means for measuring the level of the selected group of three stacks K can employ a detector which operates with one or more laser beams and is capable of transmitting corresponding signals to the memory of the control system in a manner well known from the art and not forming part of the present invention. The robot arm 18 further ascertains the exact location of the selected group of stacks K in the directions of the arrows X and Y, and the corresponding signals are also transmitted to the memory of the control system. In the next step, the arm 18 moves the head 22 to the locus of storage of the tool A and the jaw chuck F is actuated to engage the internal surface of the centering member 2. The next step involves the transfer of the head 22, with the tool A suspended thereon, to the locus of the group of three stacks K which are to be transferred onto the conveyor C.

The centering member 2 of the tool A is provided with one, two or more plugs or sockets 3 constituting portions of means for separably connecting one, two or more sets of suction heads 12 with a suction generating device, e.g., a suction pump, a fan or another suitable apparatus which can draw air through one or more at least partially flexible conduits 4 each extending between one of the connecting means 3 and the corresponding part 13 of the means for supporting the stacks K from below while the stacks are being attracted to the respective sets of suction heads 12. The suction generating device or devices are installed in or constitute a holder 36 of or on the robot arm 18. The conduit or conduits 4 are provided with sockets or plugs which can be fluid tightly attached to the respective connecting means 3. The chuck F is actuated to engage the internal surface of the centering member 2 prior or subsequent to attachment of the conduit or conduits 4 to the plugs or sockets 3. The chuck F and the annular member 2 can be designed to establish a form-locking and/or a force-locking connection between the head 22 of the robot arm 18 and the tool A. The annular member 2 of the tool A and/or the holder 36 carries one or more vertical centering pins 14 which further ensure that the tool A is properly centered on the head 22 when the coupling step by the chuck F and the annular member 2 is completed. The centering pin or pins 14 on the holder 36 can enter suitable holes or bores of the member 2, they can engage the internal surface of the member 2 and/or they can engage the external surface of the member 2 in order to ensure that the tool A is coupled to the head 22 in a predetermined position.

The annular member 2 and the centering pins 14 can be mounted on a plate-like horizontal base 1 of the tool A. The conduit or conduits 4 can extend through or around the base 1 to connect the respective plugs or sockets 3 (and hence the suction generating device) with the suction heads 12 which are located at the underside of the base 1. The latter further supports three brackets 10 each of which mounts a plate-like holder 11 for a set or array of suction heads 12. For example, each holder 11 can support a set or array of twelve elastic suction heads 12 with at least some freedom of lateral and/or other movement to facilitate reliable engagement and lifting of a stack K when the suction generating device 36 or a suction generating device in 36 is operative to draw air into the suction heads 12. Each plate-like holder 11 can further confine a group of spring-biased pins or bolts, not specifically shown.

Each holder 11 is connected with the intake end of one of the conduits 4 and the control system of the robot manipulator is designed to connect the suction generating device with one, two or all three holders 11, i.e., with any set of suction heads 12 independently of each other set.

Each bracket 10 supports the respective plate-like holder 11 as well as a guide 9 which extends transversely of the respective holder 11 and is provided with special flat guide means and a roll circulation stand having a stop. The guides 9 are further connected to a bracket or carrier 5 and this carrier mounts the supports 13 which can engage the stacks K of a group of such stacks from below. The arrangement is such that, once a group of three stacks K has been lifted off its pallet P by the respective sets of suction heads 12, the supports 13 (each of which can include a polygonal—such as a rectangular—plate) are pivoted from the idle or inoperative positions shown in FIG. 4 by solid lines to operative positions which are shown in FIG. 4 by broken lines to engage the respective stacks K from below before the robot arm 18 is set in motion to transfer the tool A and the three stacks K on the supports 13 toward and onto the conveyor C.

The means for moving the supports 13 between their idle and operative positions comprises a vertically reciprocable annular pusher 33 which forms part of the robot arm 18, and means for transmitting motion between the pusher 33 and the supports 13. The motion transmitting means comprises at least one two-armed lever 16 which is pivotably mounted on the carrier 5, as at 16a, and one arm of which carries at least one roller follower 20 located in the path of downward movement of the pusher 33. The other arm of the lever 16 is connected with a coil spring or another suitable spring 15 which biases the lever in a counter-clockwise direction, else viewed in FIG. 4, so that the roller follower or followers 20 bear against the underside of the vertically reciprocable pusher 33. The downward movement of the roller follower or followers 20 is terminated when such follower or followers reach the upper side of the base 1.

At least a portion of the motion transmitting means including the lever 16 can be installed in the carrier 5, and such motion transmitting means further comprises an elongated connecting member 6 here shown as a push rod which couples the other arm of the lever 16 with a gear 34 in such a way that the gear 34 is rotated when the push rod 6 moves in response to pivoting of the lever 16. The lever 16 and the rod 6 can be said to constitute a linkage which connects the follower or followers 20 with a transmission 7 including the gear 34 and another gear 35 on a horizontal shaft 8. The shaft 8 mounts and can pivot the supports 13. The shaft 8 is rotatable in one or more bearings in or on the carrier 5 and can turn each of the three supports 13 through all angle of approximately 135°. The gears 34, 35 are or can be in permanent mesh so that they can turn the shaft 8 (and hence the supports 13) in a clockwise or in a counterclockwise direction, either in response to downward movement of the follower or followers 20 due to downward movement of the annular pusher 33 or in response to dissipation of energy by the spring 15.

When the head 22 causes the tool A to descend from above toward a selected set of three stacks K on a selected pallet P in or at the space 25, the suction heads 12 are caused to lift the three stacks K in response to upward movement of the robot arm 18 or its head 22. The extent of upward movement of the three stacks K is such that there is ample room for pivoting of the three supports 13 to the broken-line positions of FIG. 4, i.e., into engagement with the undersides of the respective stacks K. The pivoting of the supports 13 from the idle positions to the operative positions is caused by the descending pusher 33 which induces the follower or followers 20 to pivot the lever 16 in a clockwise direction (as viewed in FIG. 4) so that the gear 34 is rotated and rotates the gear 35 and the shaft 8 in a direction to pivot the supports 13 in a counterclockwise direction.

The other end of the lever 16 is or can be articulately connected to the upper end of the push rod 6 by a universal joint (such as a spherical joint) 17, and a similar joint can be employed to articulately connect the lower end of the push rod 6 with the gear 34. Each support 13 can abut a portion of or the entire lowermost blank in the respective stack K. All that counts is to ensure that the supports 13 cooperate with the respective sets of suction heads 12 to reliably transfer groups of three stacks K from a selected pallet P onto the conveyor C or to another destination so that the stacks can be advanced to a processing station, e.g., into a packing machine which converts each blank into a hinge lid packet or another suitable packet for a selected number of rod-shaped articles of the tobacco processing industry. It is further clear that the power train including the linkage 16, 6 and the transmission 7 can be designed to pivot each of the supports 13 through an angle of approximately 180° or any other angle which suffices to move the supports between their operative positions of engagement with the undersides of stacks K and idle positions in which the supports are out of the way so that the sets of suction heads 12 can be lowered toward and against the uppermost blanks of the selected set of stacks.

The supports 13 not only serve as rests for the stacks K which are suspended on the respective sets of suction heads 12 but they can also serve as a means for urging the stacks upwardly toward the respective plate-like holders 11. To this end, the motion transmitting means including the gear train 7 can be designed in such a way that it tends to pivot the supports 13 counterclockwise and upwardly beyond the operative positions of FIG. 4. Such mounting of the supports 13 enables the tool A to compensate for eventual deviations of the heights of certain stacks K from a standard or prescribed height, and such compensation can take place in a fully automatic way. Furthermore, the supports 13 can serve as a means for maintaining the lowermost blanks of the respective stacks K at a predetermined level not later than during deposition onto the conveyor C or directly into the magazine of a processing machine.

The dimensions of the supports 13 can be selected in such a way that the tool A can be conveniently moved to requisite position for the lifting of selected numbers of stacks K from a pallet P even if the pallets P in or at the space 25 are closely adjacent each other, e.g., if the spacing of neighboring pallets P or of the stacks K on neighboring pallets P is not more than 200 mm.

Each of the three plate-like holders 11 is or can be suspended on its bracket 10 with freedom of axial movement and under spring bias. This also contributes to the ability of the tool A to compensate for eventual departure of the height of one or more stacks K from a predetermined height. Furthermore, each of the three sets of suction heads 12 can be individually connected to or disconnected from the suction generating device so that each such set can attract a stack K independently of the other sets. This can be readily achieved by the provision of suitable valves in the holders 11, in the conduits 4 or in the holder 36 of the robot arm 18. The signals can be transmitted by the control system of the manipulator.

Figure 5:
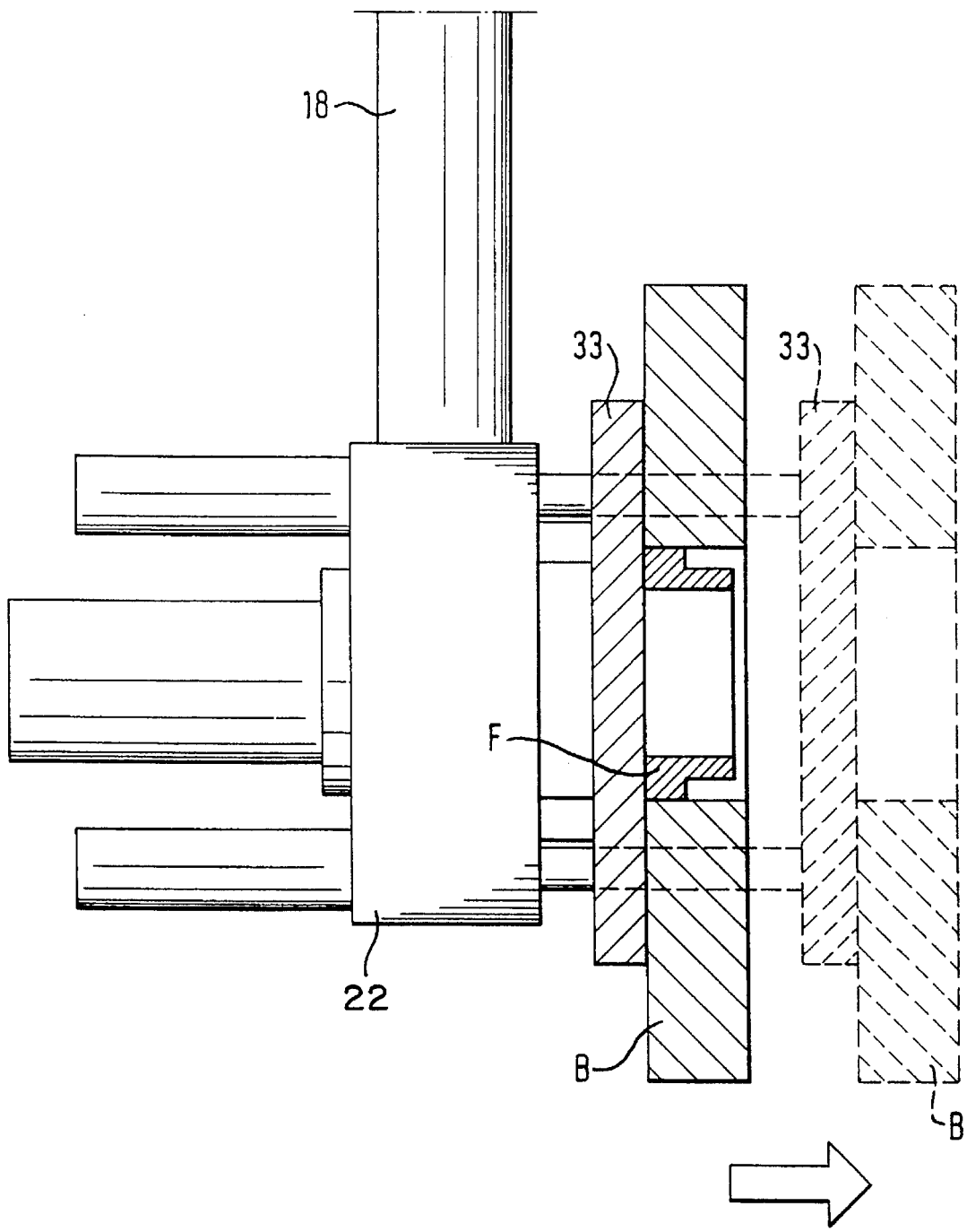
FIG. 5 illustrates a portion of the head of the robot arm and a bobbin which is separably coupled to a jaw chuck of the head.

FIG. 5 illustrates the manner in which the head 22 of the robot arm 18 can be utilized for the gripping of fresh bobbins and for separation of fresh or spent bobbins. The illustrated chuck F is assumed to have three jaws which can be moved apart upon insertion into the central hole of the core of a fresh bobbin B to be thereupon expanded in order to frictionally engage the cylindrical internal surface of the core. If a properly grasped bobbin is to be separated from the head 22, the frictional engagement between its internal surface and the jaws of the chuck F is somewhat relaxed and the annular pusher 33 is thereupon shifted axially of the head 22 in order to strip the bobbin off the jaws of the chuck F. A fresh bobbin B which has been transferred from a magazine or from a pallet into a cigarette making or packing machine can be delivered to and introduced into a bobbin changer (not shown) in response to at least some relaxation of frictional engagement of its core with the jaws of the chuck F and subsequent axial movement of the pusher 33 in a direction to strip the bobbin off the jaws. Thus, the improved robot arm 18 can be put to use with a tool A or without any tool, and its chuck F as well as its pusher 33 can perform an important function in each such case. FIG. 5 shows the position of a bobbin B prior to separation from the chuck F by solid lines, and the position of the bobbin upon completed separation from the head 22 of the robot arm 18 is indicated by broken lines.

Figure 6:
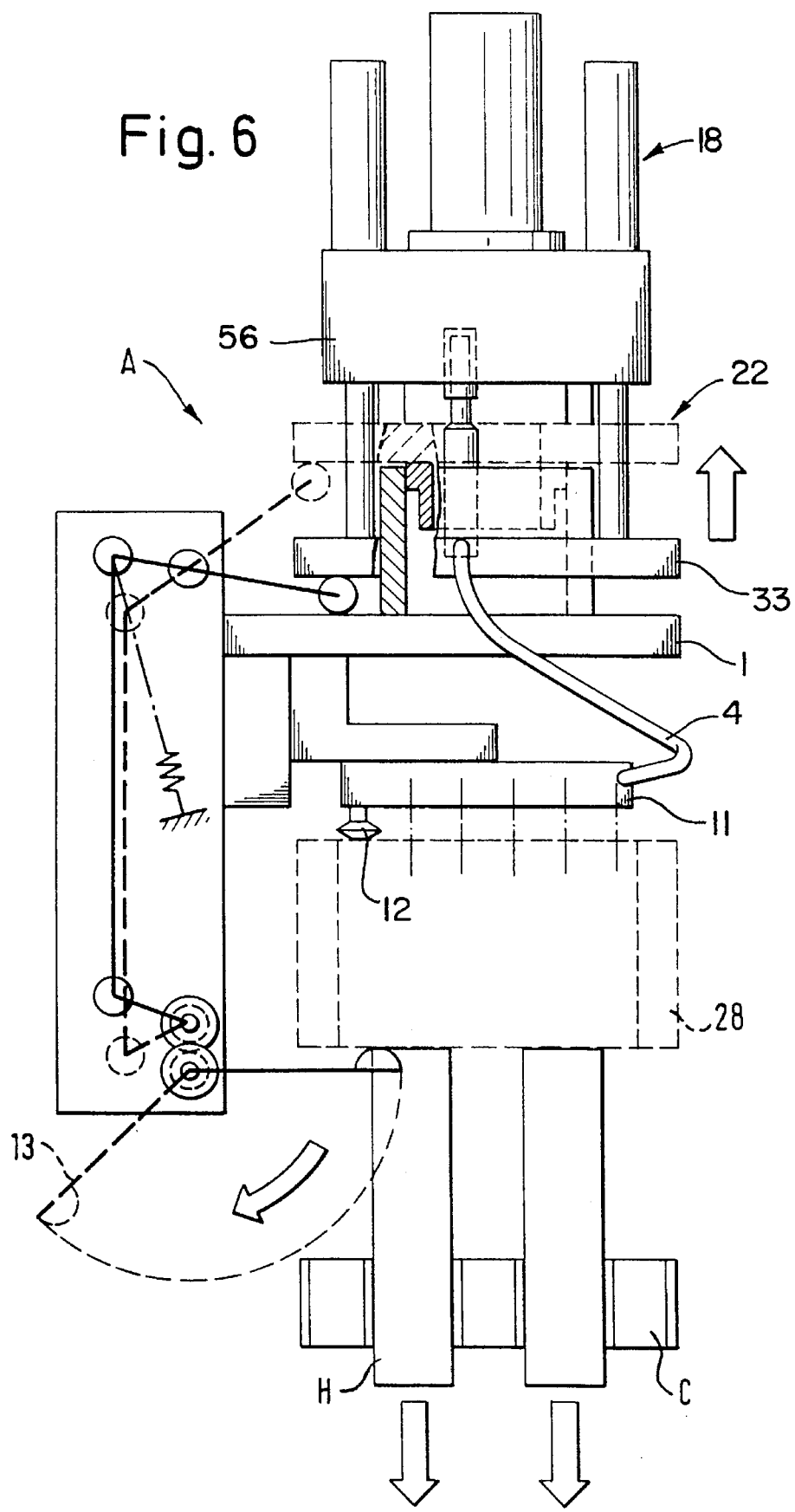
FIG. 6 illustrates the manner of transferring a stack from the tool which is separably coupled to the head of the robot arm onto the upper reaches of several discrete belts, bands or chains forming part of the composite conveyor.

FIG. 6 illustrates the manner in which a stack 28 of superimposed blanks (such as one of the stacks K shown in FIGS. 1, 2 and 4 or a stack of blanks other than those used for the making of hinge lid packets) can be deposited on the endless band conveyor C or an equivalent or analogous conveyor. The conveyor C is adjacent a table or platform H which includes several sections movable up and down between the individual endless belts or bands or chains of the composite conveyor C. The upper end portions of the sections of the platform or table H can move into actual abutment with the underside (of the lowermost blank) of a single stack 28 or with the undersides of two or more stacks 28, depending on the number of stacks 28 which are being attracted by the suction heads 12. The sections of the table or platform H are held in the raised positions which are actually shown in FIG. 6 when they are ready to accept one or more stacks 28. The disengagement of one or more stacks 28 from the tool A which is mechanically and separably coupled to the head 22 of the illustrated robot arm 18 involves pivoting of the support or supports 13 from the operative positions back to the idle positions and subsequent disconnection of the suction heads 12 from the suction generating device, e.g., a device in or on the holder 36 of the robot arm 18. The sections of the table or platform H are thereupon lowered below the upper level of the composite conveyor C so that the stack or stacks 28 come to rest on the conveyor and are ready to be transported to the magazine of a packing machine, not shown.

An important advantage of the improved robot arm is that it can utilize a standard head with a chuck which is capable of properly engaging certain objects, such as bobbins, and that the same arm with the same head or a similar head can be utilized in conjunction with a tool, such as the tool A, for manipulation of commodities which cannot be manipulated by the head alone. Furthermore, the head can be mechanically and separably coupled to the tool A or an analogous tool without necessitating the provision of any additional or special coupling means on the head and/or on any other part of the robot arm. This contributes to simplicity as well as to versatility of the improved manipulator and shortens the intervals for conversion of the robot arm for direct engagement with certain objects, such as bobbins, or for indirect engagement by way of the tool A or an analogous tool which has a substantially cylindrical surface engageable by the claws of the chuck F. The versatility of the improved manipulator is not determined exclusively by the utilization of the chuck F as a means for properly engaging a bobbin B or an analogous object or for properly engaging the tool A. The chuck F can be used with equal advantage to engage any other tool which has a surface (preferably a cylindrical surface) adapted to be frictionally engaged by the jaws of the chuck on the head 22.

The illustrated one-piece annular pusher 33 can be replaced with a composite pusher or with a set of pushers which are capable of performing the same functions, namely of actuating the support or supports 13 and of stripping a bobbin B or an analogous object off the jaws of the chuck F or another suitable chuck. The pusher 33 or an equivalent pusher or set of pushers can be actuated by remote control to pivot the support or supports 13 or to disengage a bobbin or another object from the jaws of the chuck F. This simplifies the construction, the bulk and the mode of operation of the robot arm 18.

The plugs or sockets 3 of the head 22 are preferably designed in such a way that they are automatically connected with the respective ends of the corresponding conduits 4 when the internal surface of the annular centering member 2 of the tool A is properly engaged by the jaws of the chuck F. This ensures that the suction-operated means including the holder or holders 11 and the set or sets of suction cups or heads 12 are properly connected with the suction generating device (such as 36 or a device in or on the part 36 of the head 22) in automatic response to proper coupling of the tool A to the head 22.

The diameter of the at least substantially cylindrical internal surface of the annular member 2 of the tool A may but need not be identical with the diameter of the at least substantially cylindrical internal surface of a bobbin B or another object which is to be directly engaged by the jaws of the chuck F. All that counts is that the chuck F be capable of properly engaging bobbins B or like objects or the annular member 2 of the tool A or an equivalent tool.

The internal surface of the annular member 2 of the tool A can be configured in such a way that it can be even more reliably engaged by the jaws of the chuck F or an equivalent chuck. It has been found that, at least in many instances, a pronounced frictional engagement between the jaws of the chuck F and the internal surface of the annular member 2 suffices to establish a highly reliable force-locking connection between the member 2 and the chuck F. A form-locking connection can be established, for example, by providing the internal surface of the member 2 with recesses for portions of jaws forming part of the chuck F. It is also possible to provide the internal surface of the member 2 with a circumferentially complete groove which receives portions of jaws forming part of the chuck F when the tool A is properly coupled to the head 22 of the robot arm 18.

The jaws of the chuck F perform the additional desirable function of cooperating with the annular member 2 to properly center the tool A relative to the head 22. Such centering action is further enhanced by the provision of at least one pin 14, preferably at least two pins, to ensure the retention of the tool A in a selected angular position relative to the head 22 and to further ensure that the axis of the head coincides with the axis of the annular member 2. Accurate centering of the tool A relative to the head 22 is desirable and advantageous because this ensures automatic engagement of the plugs or sockets 3 with the respective end portions of the conduits 4 when the coupling of the tool A to the head 22 is completed.

The mounting of the suction cups or heads 12 on the respective holder or holders 11 is or can be such that the suction heads have at least some freedom of movement relative to the respective holder or holders, e.g., a play of 15 mm or thereabout. The arrangement can be such that the suction heads 12 tend to automatically return (due to their resiliency or due to resiliency of their mounting in the holder or holders 11) to predetermined starting positions when they cease to attract one or more stacks K or 28. The feature that the suction heads 12 can have a certain freedom of movement relative to the holder or holders 11 enables the suction-operated means to compensate for irregularities in the exposed surface of the topmost blank in a stack K or 28 and/or for a certain inclination of the plane of a holder 11 relative to a horizontal plane. The feature that the suction-operated means 11, 12 can simultaneously lift two or more stacks K or 28 contributes significantly to the ability of the robot arm 18 to rapidly complete the transfer of a desired number of stacks from a pallet P to the conveyor C or to another destination. The suction-operated means can be designed in such a way that it can simultaneously lift, engage and transfer two, three or more stacks K or 28. For example, if a set of suction heads or caps 12 and the corresponding holder 11 is out of commission, the robot arm 18 can continue the transfer of m–1 stacks wherein m is the total number of holders 11 or sets of suction heads. Furthermore, it is possible to automatically deactivate one or more constituents of the suction-operated means (e.g., by disconnecting one or more sets of suction heads 12 from the suction generating device) if the machine or machines which receive blanks from the storage facility of FIGS. 1 and 2 can operate at a desired speed while the robot arm 18 is set up to simultaneously transfer less than the maximum number of stacks. Still further, and if the robot arm 18 is set up to simultaneously transfer a maximum number (e.g., three) of stacks K or 28 to one or more consuming machines, the same robot arm is then available to transfer bobbins B and/or other objects during the intervals between successive transfers of maximum numbers of stacks, either to the machine or machines which receive the stacks or to other machines in a cigarette making plant or in another plant of the tobacco processing industry. In other words, if the robot arm 18 is set up to simultaneously transfer a maximum number of stacks, longer intervals of time are available for the use of the same robot arm to carry out other transferring operations.

The suction-operated means of the tool A can comprise a single polygonal (e.g., rectangular) plate-like support 13 or two or more supports, one for each set of suction heads 12. An advantage of plural supports 13, each of which is preferably pivotable independently of the other support or supports, is that two or more stacks K or 28 can be properly supported from below during transfer from a pallet P onto the conveyor C or to another destination. If two or more supports 13 are used, their mutual spacing is preferably such that they permit the sections of the vertically movable platform H to move between neighboring supports 13 in order to properly support two or more stacks K or 28 during the last stage of transfer into the conveyor C. Each section of the platform H can constitute a piston rod forming part of a pneumatically or hydraulically operated cylinder and piston unit.

An advantage of supporting means including two or more discrete supports 13, particularly two or more supports which are movable relative to each other in a common plane, is that such supports can be readily distributed in their common plane in such a way that they can properly support from below a single stack of large blanks of paper or the like, two relatively large stacks or three or even more smaller stacks. This ensures that each stack K or 28 which is in the process of being transferred by the tool A is properly supported from below while its uppermost blank is attracted by one or more sets of suction heads 12. In other words, the feature that two or more supports 13 are movable toward and away from each other in their common plane ensures that the exact dimensions of the blanks in a stack do not affect the ability of the tool A to transfer such stacks from a pallet P onto the conveyor C or to another destination.

The aforedescribed motion transmitting assembly between the pusher 33 of the head 22 and the support or supports 13 of the tool A constitutes but one of a number of suitable motion transmitting assemblies which can be utilized in the improved combination of head 22 and tool A. The illustrated assembly is simple, compact and reliable and it can receive motion from the pusher 33 which performs the additional function of stripping fresh or exhausted bobbins B off the chuck F of the head 22.

The roller follower or followers 20 of the lever 16 can be replaced by other types of followers without departing from the spirit of the invention. A roller-shaped or another rotary follower is preferred at this time because its engagement with the descending pusher 33 of the head 22 entails the development of negligible friction. The base 1 performs the additional desirable function of terminating the downward movement of the follower 20 (i.e., of terminating the pivotal movement of the lever 16 in response to downward movement of the pusher 33) when the support or supports 13 assume or are at least close to their operative positions.

The transmission 7 also constitutes but one of numerous available transmissions which can convert reciprocatory movements of the push rod 6 into rotary movements of the shaft 8 for the support or supports 13. The illustrated transmission 7 is preferred at this time because it is simple, reliable, inexpensive and occupies a minimal amount of space.

The support or supports 13 of the illustrated tool A are presumed to be polygonal, e.g., rectangular or square. Such support or supports have been found to be particularly suitable in connection with the transport of stacked blanks for the making of hinge lid packets or the like. However, it is also within the purview of the invention to employ circular, oval or otherwise configured supports.

The tool A or an equivalent tool can be designed in such a way that a departure or tolerance of up to 20 mm from a prescribed width or length (e.g., 97 mm) of a blank forming part of a stack K or 28 can be readily compensated for by moving the suction-operated means 11, 12 and/or one or more supports 13 to proper positions.

A presently preferred use of the improved robot arm with or without a tool A or analogous tool is in manipulators which constitute or are combined with or form part of so-called portal type overhead conveyors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A manipulator comprising an arm including a head movable along a plurality of substantially straight paths and rotatable about at least one axis, a tool having means for gripping stacks of substantially flat objects, said gripping means including suction-operated means for engaging the stacks from above and mobile means for supporting the stacks from below and said tool further having a carrier for said supporting means; means for mechanically and separably coupling said tool to said head including a jaw chuck provided on said head and arranged to engage a substantially cylindrical surface of said tool; a suction generating device; means for connecting said device to said suction-operated means when said tool is coupled to said head; and means for moving said supporting means including a pusher movably carried by said head and means for transmitting motion from said pusher to said supporting member, said motion transmitting means comprising at least one lever pivotable on said carrier and having follower means engageable by said pusher, a shaft rotatably supported by said carrier and mounting said supporting means, a connecting member receiving motion from said at least one lever, and a transmission between said member and said shaft.

2. The manipulator of claim 1, wherein said arm has an axis and said follower means comprises at least one roller follower on said at least a one lever, said pusher being movable in the direction of the axis of said arm.

3. The manipulator of claim 2, wherein said tool further includes a base and said supporting means is pivotable between an idle position and an operative position, said at least one roller follower abutting said base in the operative position of said supporting means.

4. The manipulator of claim 3, wherein said motion transmitting means comprises means for yieldably biasing said at least one roller follower away from said base.

5. The manipulator of claim 1, wherein said connecting member includes a push rod and said transmission is a gear transmission.

6. The manipulator of claim 1, wherein said transmission comprises a first gear connected with said shaft and a second gear mating with said first gear and connected with said connecting member.

* * * * *